United States Patent [19]
Knutrud

[11] 3,713,304
[45] Jan. 30, 1973

[54] MOLD FOR THE PRODUCTION OF DEEPFROZEN BLOCKS OF FOOD

[76] Inventor: Leif Brudal Knutrud, Underhaugsveien 34, 1342 Jar, Norway

[22] Filed: Nov. 23, 1970

[21] Appl. No.: 91,755

[30] Foreign Application Priority Data
Nov. 24, 1969 Norway ........................4660/69

[52] U.S. Cl....................62/341, 62/60, 99/171 MP, 206/45.34
[51] Int. Cl..............................................F25c 5/14
[58] Field of Search............62/341, 62, 60, 380, 382; 99/171 MP; 25/90; 206/45.34; 220/42 A

[56] References Cited

UNITED STATES PATENTS

| | | |
|---|---|---|
| 1,201,552 | 10/1916 | Bull......................................62/60 X |
| 3,164,966 | 1/1965 | Levitz...................................62/60 X |
| 1,773,079 | 8/1930 | Birdseye.............................62/341 X |
| 1,977,373 | 10/1934 | Birdseye.............................62/341 X |
| 2,183,732 | 12/1939 | Zarotschenzeff..................62/341 X |
| 2,254,406 | 9/1941 | Zarotschenzeff......................62/341 |
| 2,408,154 | 9/1946 | Stone....................................62/341 |
| 3,220,542 | 11/1965 | Le Vesconte.....................99/192 X |

Primary Examiner—Meyer Perlin
Assistant Examiner—Ronald C. Capossela
Attorney—Wenderoth, Lind & Ponack

[57] ABSTRACT

A mold for the production of deepfrozen blocks of food, particularly fish fillet blocks, includes a rectangular shaped frame which is arranged between upper and lower trays. The mold with the goods to be frozen is placed between two freezer plates. The frame has poor heat conductivity between the side of the fillet block and the freezer plates in contact with the trays, and has a small thickness, for instance below 2 millimeters.

3 Claims, 1 Drawing Figure

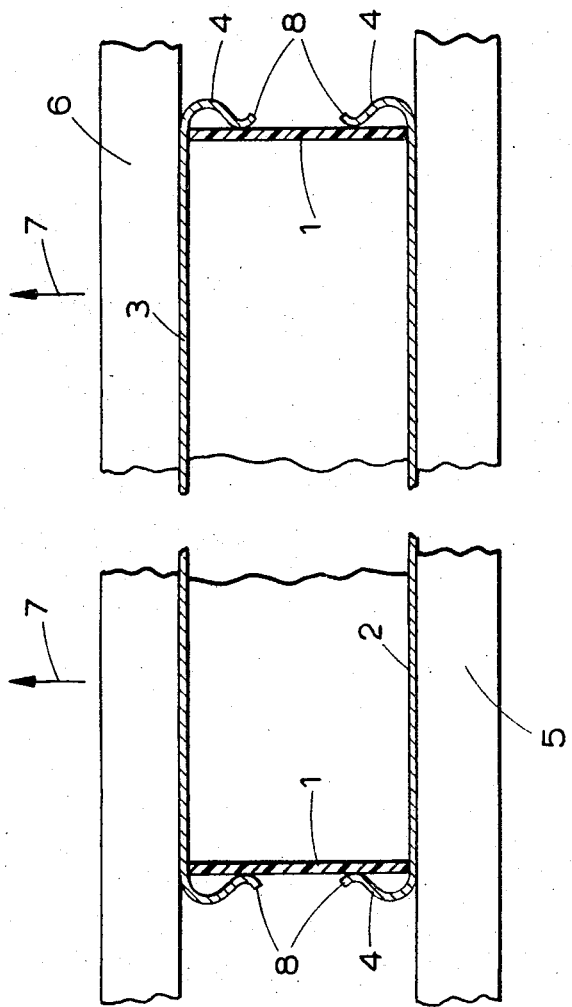

MOLD FOR THE PRODUCTION OF DEEPFROZEN BLOCKS OF FOOD

This invention concerns a mold for use in the production of deepfrozen blocks of food.

The definite industrial breakthrough with respect to deepfreezing of fish, came with an American invention of producing blocks of fish fillets for later cutting or sawing to portions down to 28 g. This portion cutting for further processing of the fish is done on a large scale in the U.S.A. and also in Europe, and the greater part of the export of fish to, for instance, the U.S.A. is in the form of fish fillet blocks for further processing in U.S.A.

Deepfrozen blocks have, however, had two major shortcomings:
a. it has been very difficult to produce homogeneous blocks, that is to say without any voids. This has led to great difficulties in keeping the cut portions within narrow weight tolerances. However, this problem has been solved through U.S. Pat. application Ser. No. 783,357 filed Dec. 12, 1968 now U.S. Pat. No. 3,555,784.
b. the blocks deviate from desired geometrical form. In preparation for freezing, the fillets are put in a mold consisting of a square-shaped frame arranged between two trays, with a view of processing a block with square angles in a parallelepipedic form. The blocks are generally of limited height and a frequently used block size has a length of 50 cm, a width of 30 cm and a height of 4,2 cm. Experience shows, however, that even if the frames are kept within certain tolerances, the top of the block will not completely even inasmuch as the edges will be radiused at approximately 5 mm and the top main side of the block will be hunchbacked.

The radius on the edges and the hunchback will be important factors forbidding a complete use of the block.

The purpose of the invention is to provide a mold for the production of blocks of food, particularly fish fillet blocks with a desired geometrical form, which is a square-angled parallelepiped. A further purpose of the invention is to supply such a frame which at the same time is so inexpensive and light, that the use of the frame as part of the packing material for shipment of the frozen blocks is justified.

The inventor has discovered that both the radius at the edge of the block and the hunch at the block's top side, is caused by faster cooling at the edges of the block than in the central part. The reason for this is to be found in the heavy iron frames used hitherto. Because of these heavy iron frames the heat transport from the fillet block during freezing in a plate freezer, will take place not only vertically to the plates in the freezer, but also over the heavy iron frame to the freezer plate underneath. As a result the freezing front as it moves through the block, will not move parallel to the freezer plates, but in an advanced position towards the edges resulting in a freezer bridge at these edges. The expansion which takes place in the still unfrozen parts of the block, will therefore not occur as an even distribution over the top surface of the block, because the freeze bridge has closed the expansion possibility along the edges.

As a consequence of this discovery, a frame is used for the invention which has a poor heat conductivity between the vertical sides of the block and the freezer plates.

Such a poor heat conductivity can be obtained in several ways, all of which, however, are not equally advantageous, as due regard has to be taken to the strength of the frame at a limited thickness. A thick material will both increase the heat conductivity and result in great space demand for the frame. If the frame is constructed thicker than 15 mm, for instance, this will reduce the capacity of the plate freezer by approximately 25 percent.

According to the invention, the frame is made of plastic material. As mentioned above, this will result in special problems with regard to the thickness of the frame. However, as a further characteristic of the invention, trays are used which have special formed edges giving support to the frame. These trays are constructed for instance of steel, and the edges are curved in such a way that they support the plastic frame linearly at a certain distance from the bottom or top edge.

Thereby, sufficient strength and dimensional stability is imparted to the block mold without having to resort to a great thickness of the frame itself.

The method even permits the application of frames so thin that it will be economically permittable that the frames are used only once and are left on the block before shipment as a part of the final packaging material. The invention therefore also includes a frame used with trays, with supporting edges as indicated above, the frame to be made of plastic material, having a limited thickness, for instance below 2 mm. When such a frame is used as part of the shipping material, it also contributes to the protection of the fish block and can furthermore be used as a carrier of a description of the content etc. The user of the block will easily be able to take the frame off, using a knife to cut through it, an operation which is facilitated through the fact that the frame eaily allows a knife to enter between itself and the fish block.

A more detailed description of the invention now follows, with reference being made to the single FIGURE which shows a schematic section of the mold between two freezer plates.

The drawing shows a mold consisting of a rectangular shaped thin plastic frame 1, two plates or trays 2 and 3 with a specially shaped edge 4 surrounding the frame and supporting it at a given distance from the top and bottom thereof for instance ¼ of the height of the frame. To freeze the fish fillets placed in the mold, the mold is placed between the freezer plates 5 and 6 indicated in the drawing. The freezing process will give a certain expansion of the fillet mass, which results in a movement of freezer plate 6 in the direction of the arrow 7. The trays 2 and 3 are similarly shaped and may be constructed of stainless steel to obtain (a) a smooth hygienic surface which can easily be cleaned and (b) sufficient strength in the curved parts 4 to support frame 1 and secure the correct dimensions of the frozen block. The curved parts 4 may extend over the whole length of each side edge of the frame. If necessary for reason of stability, the curved parts 4 may at their ends be interconnected near to the free edges 8, whereas the corners are left open near the bottom of the tray to permit easy draining after cleaning. The illustrated shape of the curved edge parts 4 results in only a linear contact between the frame 1 and the sides of the trays. This is an important factor, as thereby the heat conductivity over the tray to the freezer plates is limited to a desirably low level. The curved shape given to part 4 of the tray also allows easy adjustment of the distance between opposed edges for correction purposes.

Trays executed as shown permit the use of thin material in the frames, for instance plastic frames with less than 2 mm thickness. Such frames can be produced at sufficiently low price to allow them not to be re-used, but instead to remain on the block as part of the packaging material of the block.

I claim:

1. Mold for the production of deep frozen blocks of food, particularly fish fillet blocks, adapted to be filled with food to be frozen and to be placed between two freezer plates in a plate freezer for freezing under substantial pressure, comprising a rectangular frame having opposite open ends, an upper and lower tray, said frame being arranged between said trays with said trays covering said opposite open ends, said frame having thin walls of a material having low heat conductivity, at least one of said trays having upstanding walls along its edges, said upstanding walls being shaped so as to support the walls of said frame exteriorly by contacting the same only at spaced points in an area at a distance inwardly from the planes of said trays, whereby the requisite strength of the mold and poor heat conductivity between the sides of the food block and the freezer plates are obtained.

2. Mold according to claim 1, in which both the upper and the lower tray is provided with upstanding walls.

3. Mold according to claim 1, in which said upstanding walls contacts said frame in a narrow area parallel to the plane of said trays.

* * * * *